United States Patent
Kanno et al.

(10) Patent No.: US 7,387,311 B2
(45) Date of Patent: Jun. 17, 2008

(54) MODULE COVER FOR AIRBAG APPARATUS

(75) Inventors: Yuki Kanno, Shiga (JP); Shinji Hayashi, Shiga (JP)

(73) Assignee: Takata Corporation, Tokyo (JP)

( * ) Notice: Subject to any disclaimer, the term of this patent is extended or adjusted under 35 U.S.C. 154(b) by 247 days.

(21) Appl. No.: 10/682,533

(22) Filed: Oct. 10, 2003

(65) Prior Publication Data

US 2004/0113398 A1 Jun. 17, 2004

(30) Foreign Application Priority Data

Dec. 12, 2002 (JP) ............................. 2002-360852

(51) Int. Cl.
*B60R 21/20* (2006.01)
(52) U.S. Cl. .................................... 280/728.3; 280/732
(58) Field of Classification Search ............ 280/728.1, 280/728.2, 728.3, 732, 743.1
See application file for complete search history.

(56) References Cited

U.S. PATENT DOCUMENTS

| | | | | |
|---|---|---|---|---|
| 5,527,063 A | * | 6/1996 | Garner et al. ............ 280/728.2 |
| 5,651,562 A | * | 7/1997 | Hagen et al. ............ 280/728.3 |
| 6,070,901 A | * | 6/2000 | Hazell et al. ............ 280/728.3 |
| 6,076,851 A | * | 6/2000 | Davis et al. ............. 280/728.2 |
| 6,345,837 B1 | * | 2/2002 | Warnez et al. ........... 280/728.3 |
| 6,595,543 B2 | * | 7/2003 | Desprez ................... 280/728.3 |
| 6,601,870 B2 | * | 8/2003 | Suzuki et al. ............ 280/728.3 |
| 6,612,607 B1 | * | 9/2003 | Takahashi ................ 280/728.3 |
| 6,692,017 B2 | * | 2/2004 | Taoka et al. ............. 280/728.2 |
| 7,004,499 B1 | * | 2/2006 | Preisler ..................... 280/732 |
| 2004/0026902 A1 | * | 2/2004 | Yasuda et al. ........... 280/728.2 |

FOREIGN PATENT DOCUMENTS

| | | |
|---|---|---|
| JP | 10-236265 A | 9/1998 |
| JP | 11-236483 A | 8/1999 |
| JP | 2002-012116 A | 1/2002 |

* cited by examiner

*Primary Examiner*—Toan C. To
(74) *Attorney, Agent, or Firm*—Foley & Lardner LLP

(57) ABSTRACT

A module cover for an airbag apparatus. The module cover includes a plate member and a leg member. The leg member extends from the back surface of the plate member. The plate member and the leg member are formed separately and joined after formation. The plate member is formed of thermoplastic elastomer.

22 Claims, 3 Drawing Sheets

MODULE COVER FOR AIRBAG APPARATUS

BACKGROUND

The present invention relates to an module cover for an airbag apparatus.

An airbag apparatus installed in a high-speed movable body such as a motor vehicle includes a folded airbag, a retainer to which the airbag is mounted, an inflator (gas generator) for deploying the airbag, and a module cover covering the airbag. The module cover includes a top plate member and a leg strip member standing upright from the back surface of the top plate member. The leg strip member is connected to the retainer.

When the inflator generates gas, the airbag starts deployment, the module cover is broken and pushed opened along a tear line, and the airbag is deployed in the vehicle cabin, so that an occupant is protected.

In Japanese Unexamined Patent Application Publication No. 2002-12116 (incorporated by reference herein), a module cover in which a top plate member and a leg strip member are formed separately of synthetic resin and are joined by vibration welding is disclosed. When the top plate member and the leg strip member are integrally molded, there is a tendency that molding sink is generated on the front surface of the top plate member at the portion of the top plate member continuing from the leg strip member. However, when the top plate member and the leg strip member are formed separately and joined together, such molding sink on the front surface of the top plate member is avoided, and thus a module cover which is superior in appearance is obtained.

In the module cover disclosed in the above described Japanese Unexamined Patent Application Publication No. 2002-12116, the leg strip member has a square shape including a plate-shaped reinforcing member overlapping with the back surface of the top plate member and a mounting portion extending upright from the peripheral edge of the reinforcing portion. When the square-shaped leg strip member is joined to the top plate member by vibration welding, the reinforcing member is fixed to the area near the center of the top plate member. Therefore, rigidity of the top plate member is increased, and thus a force required for opening the top plate member when the airbag is deployed increases as well. In addition, a high-power inflator must be employed correspondingly.

Accordingly, there remains a need for a module cover for an airbag apparatus in which the top plate member can easily be opened when the airbag is deployed.

SUMMARY OF THE INVENTION

According to an embodiment of the present invention, a module cover for an airbag apparatus is provided. The module cover includes a top plate member and a leg strip member standing upright from the back surface of the top plate member. The top plate member and the leg strip member are formed separately from each other and are joined after formation. The top plate member is preferably formed of thermoplastic elastomer.

Since the top plate member is preferably formed of thermoplastic elastomer, which is relatively high in flexibility, the top plate member can be pushed open with a relatively small force when the airbag is deployed.

Since the top plate member and the leg strip member are formed separately, molding sink on the front surface of the top plate member is avoided. Thus, a module cover which is superior in appearance is obtained.

According to another embodiment of the present invention, the leg strip member is preferably formed of thermoplastic resin. The leg strip member and the top plate member are joined by vibration welding so that both of them can be easily and stably connected.

According to another embodiment of the present invention, the leg strip member includes a base portion joined with the back surface of the top plate member and a leg strip body standing upright from the base portion and extending away from the back side of the top plate member. The base portion exists only on the side of the outer periphery of the top plate member with respect to the leg strip body.

In this arrangement, since the base portion of the leg strip member is disposed only on the outside of the top plate member with respect to the leg strip body, rigidity of the top plate member inside the leg strip member is not increased by the base portion. Therefore, it is not necessary to increase the output of the inflator, and thus the top plate member can open smoothly when the airbag is deployed.

In this mode, for example, the top plate member and the leg strip member can easily and stably be connected by forming the leg strip member of, for example, thermoplastic resin and joining the base portion of the leg strip member with the back surface of the top plate member by vibration welding.

According to another embodiment of the present invention, the module cover may be constructed in such a manner that a projection is formed from the back surface of the top plate member, the projection is inserted into an opening provided on the base portion, and the top plate member and the leg strip member are joined by undetachable engagement between the projection and the opening. In this arrangement, the top plate member and the leg strip member are stably connected. For example, the projection and the opening are brought into undetachable engagement by the extremity of the projection being enlarged by caulking, and the projection and the opening are brought into undetachable engagement by a clip being attached on the extremity of the projection. In this construction, the top plate member and the leg strip member are easily connected.

It is to be understood that both the foregoing general description and the following detailed description are exemplary and explanatory only and are not restrictive of the invention claimed.

BRIEF DESCRIPTION OF THE DRAWINGS

These and other features, aspects, and advantages of the present invention will become apparent from the following description, appended claims, and the accompanying exemplary embodiments shown in the drawings, which are described briefly below.

DETAILED DESCRIPTION

Embodiments of the present invention will be described below with reference to the accompanying drawings.

Figure 1:
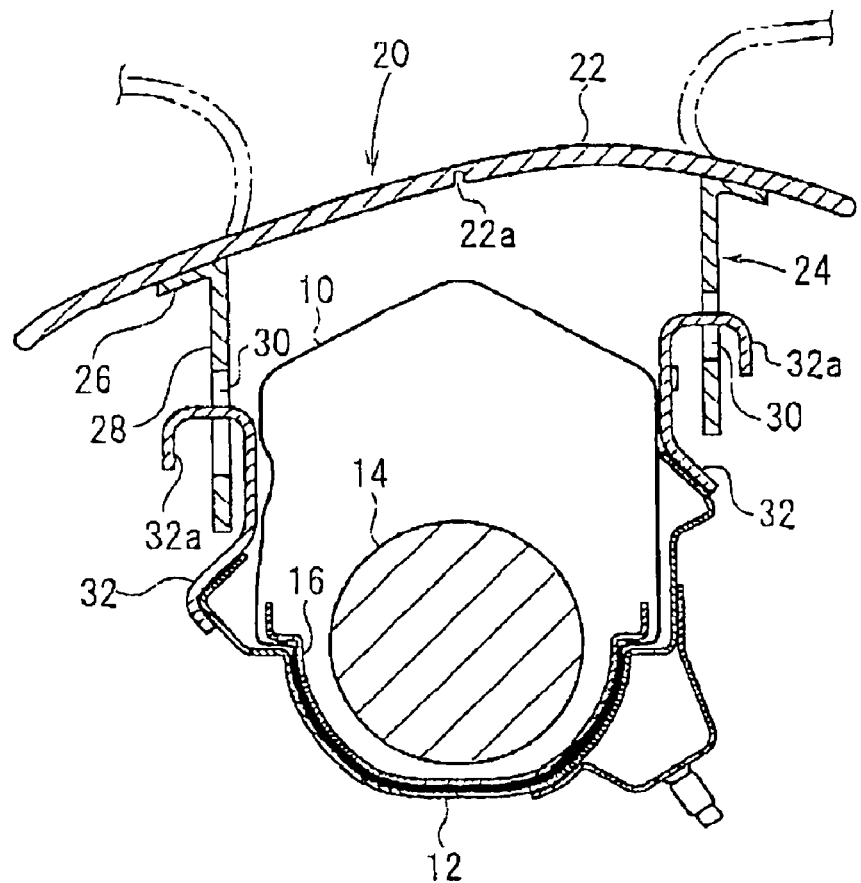
FIG. 1 is a vertical cross section of an airbag apparatus having a module cover according to an embodiment of the present invention.

According to an embodiment of the present invention, as shown in FIG. 1, the airbag apparatus is an airbag for a front passenger seat to be installed in an instrument panel (not shown), and includes a folded airbag 10; a container-shaped retainer 12 to which the airbag 10 is attached via a mounting fixture 16; an inflator 14 for deploying the airbag 10; a module cover 20 for covering the airbag 10; and a connecting fixture 32 secured to the retainer 12 by welding or the like.

The module cover 20 includes a top plate member 22 to be disposed so as to be flush with the instrument panel therearound and a leg strip (or frame) member 24 joined on the back surface of the top plate member 22. The top plate member 22 is formed with a tear line 22a formed of a groove. The leg strip member 24 includes a base portion 26 joined to the back surface of the top plate member 22 and a leg strip body (or extension member) 28 standing upright from the base portion 26 toward the back side of the top plate member 22. The leg strip body 28 is provided with an engaging hole 30 of a hooking member 32a of the connecting fixture 32.

Figure 2:
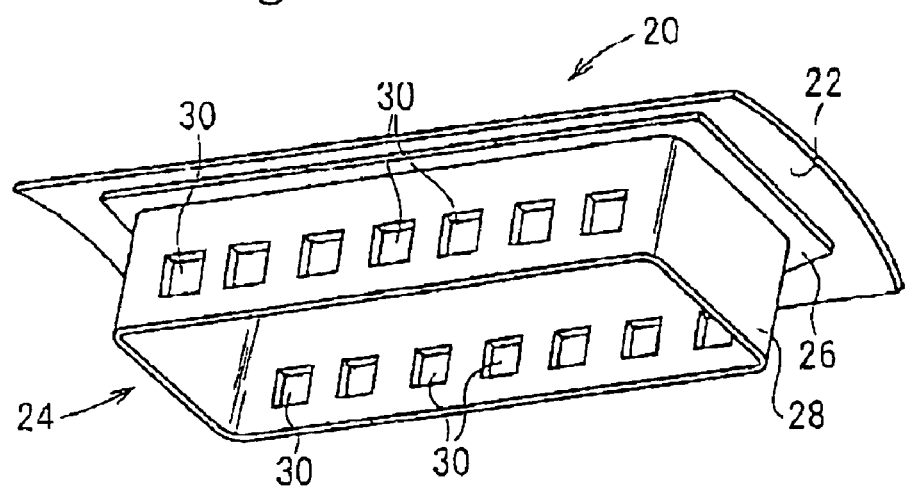
FIG. 2 is a bottom perspective view of the module cover shown in FIG. 1.

In this embodiment, as shown in FIG. 2, the leg strip body 28 is shaped like a rectangular frame so as to enclose the entire periphery of the retainer 12. The base portion 26 is provided in a flange shape extending outward from the edge of the rectangular frame-shaped leg strip body 28. In this embodiment, the base portion 26 is provided around the entire periphery of the leg strip body 28.

Figure 3:
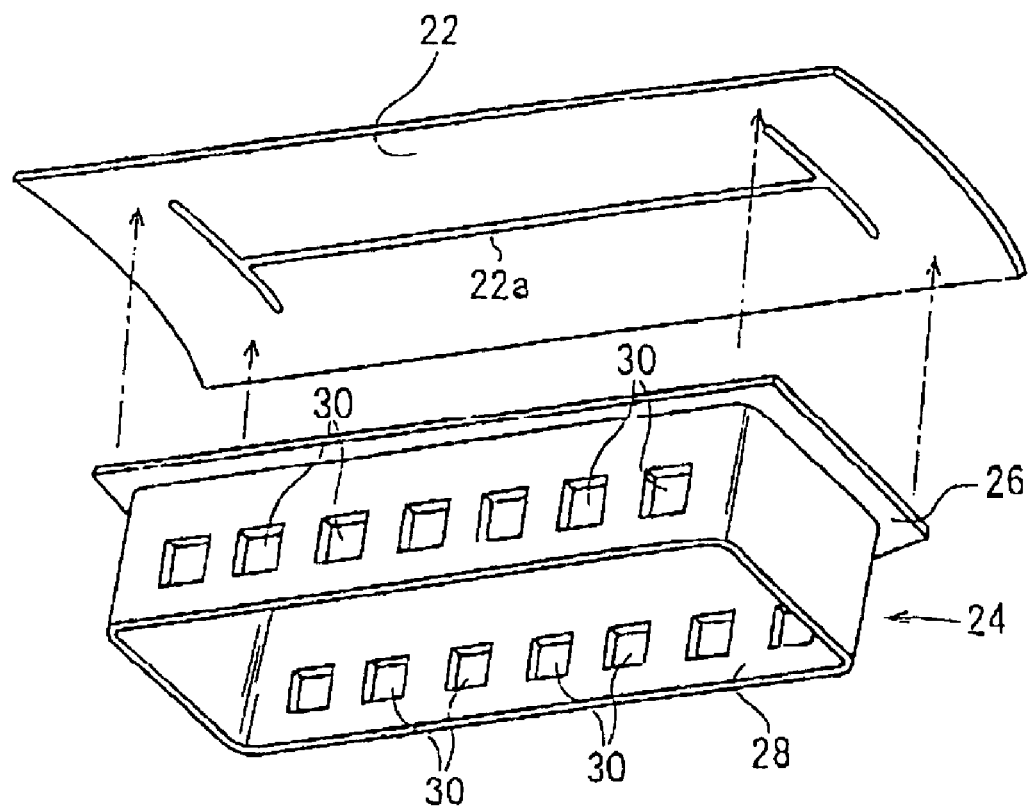
FIG. 3 is an exploded perspective view of the module cover shown in FIG. 2.

According to an embodiment of the present invention, the top plate member 22 is preferably formed of TPO (thermoplastic elastomer of Olefin group). The leg strip member 24 is preferably formed of thermoplastic synthetic resin. The thermoplastic resin may be TPO. As shown in FIG. 3, the top plate member 22 and the leg strip member 24 are joined by placing the base portion 26 on the back surface of the top plate member 22 and welding by vibration welding.

The module cover 20 is engaged with the retainer 12 so as to cover the airbag 10 and then the hooking member 32a is engaged with the engaging hole 30.

In the airbag apparatus thus constructed, when the inflator 14 is actuated and gas is injected therefrom, the airbag 10 starts deployment, and the top plate member 22 is broken along the tear line 22a. Then, as shown by chain double-dashed line in FIG. 1, the top plate member 22 is opened and the airbag 10 is deployed in front of an occupant sitting on the front seat.

In the module cover 20, since the top plate member 22 is preferably formed of TPO, which is relatively high in flexibility, and is opened as shown by chain double-dashed lines, there is a relatively small force along with deployment of the airbag 10.

In addition, in the module cover 20, since the base portion 26 of the leg strip member 24 exists only on the outside of the leg strip body 28, rigidity of the top plate member 22 in the area inside the leg strip body 28 corresponds only to rigidity of the top plate member 22. Therefore, the top plate member is bent as shown by chain double-dashed lines easily by being pressed by the deploying airbag 10. Therefore, even when a low-power inflator, of which the gas generating pressure is low, is used as the inflator 14, the airbag 10 is deployed quickly.

Having preferably formed the top plate of TPO, generation of hangnails (such phenomena that the top plate member or the flap portion are not torn exact along the tear line and part of material remains thereon, or flies in all directions) on the top plate member when the airbag is deployed is prevented. When the module cover is formed of polypropylene as disclosed in the aforementioned Japanese Unexamined Patent Application Publication No. 2002-12116, it is necessary to process the module cover to form a tear line after the module cover is formed. However, according to an embodiment of the present invention, when forming the module cover using TPO, formation of the module cover and formation of the tear line can be made simultaneously. Thus, the manufacturing process can be simplified.

Figure 4:
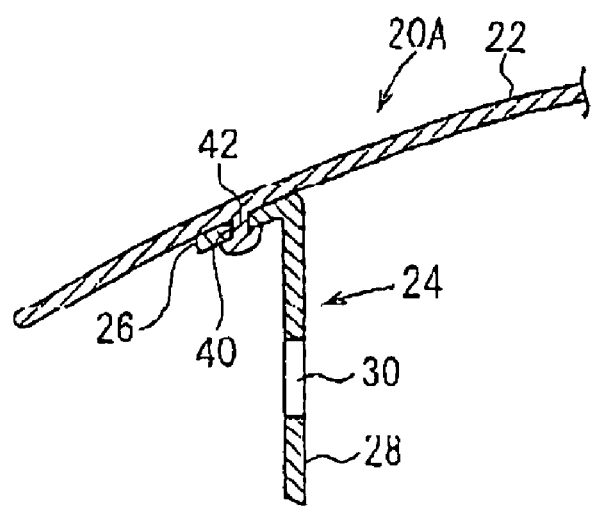
FIG. 4 is a cross sectional view of a module cover according to an embodiment of the present invention.

In the aforementioned embodiment, the top plate member 22 and the leg strip member 24 are joined by vibration welding. However, according to another embodiment of the present invention, as with module cover 20A as shown in FIG. 4, it is also possible to provide an opening 40 on the base portion 26 and a projection 42 on the back surface of the top plate member 22, inserting the projection 42 into the opening 40, enlarging the extremity of the projection 42 by caulking, thereby joining the top plate member 22 and the leg strip member 24. In order to caulk the extremity of the projection 42, ultrasonic welding or hot gas welding, for example, can be performed.

According to another embodiment of the present invention, as with module cover 20B shown in FIGS. 5(a) and 5(b), it is also possible to provide a slit-shaped opening 50 on the base portion 26 and providing a plate-shaped projection 52 on the back surface of the top plate member 22, inserting the projection 52 into the opening 50, and attaching a clip fixture 56 to the projection 52 by with a bolt 58 and a nut 60, thus joining the top plate member 22 and the leg strip member 24. The projection 52 and the clip fixture 56 are formed with holes 52a, 56a for inserting the bolt 58. As a matter of course, the clip fixture 56 has a size that can not pass through the opening 50.

Figure 5:
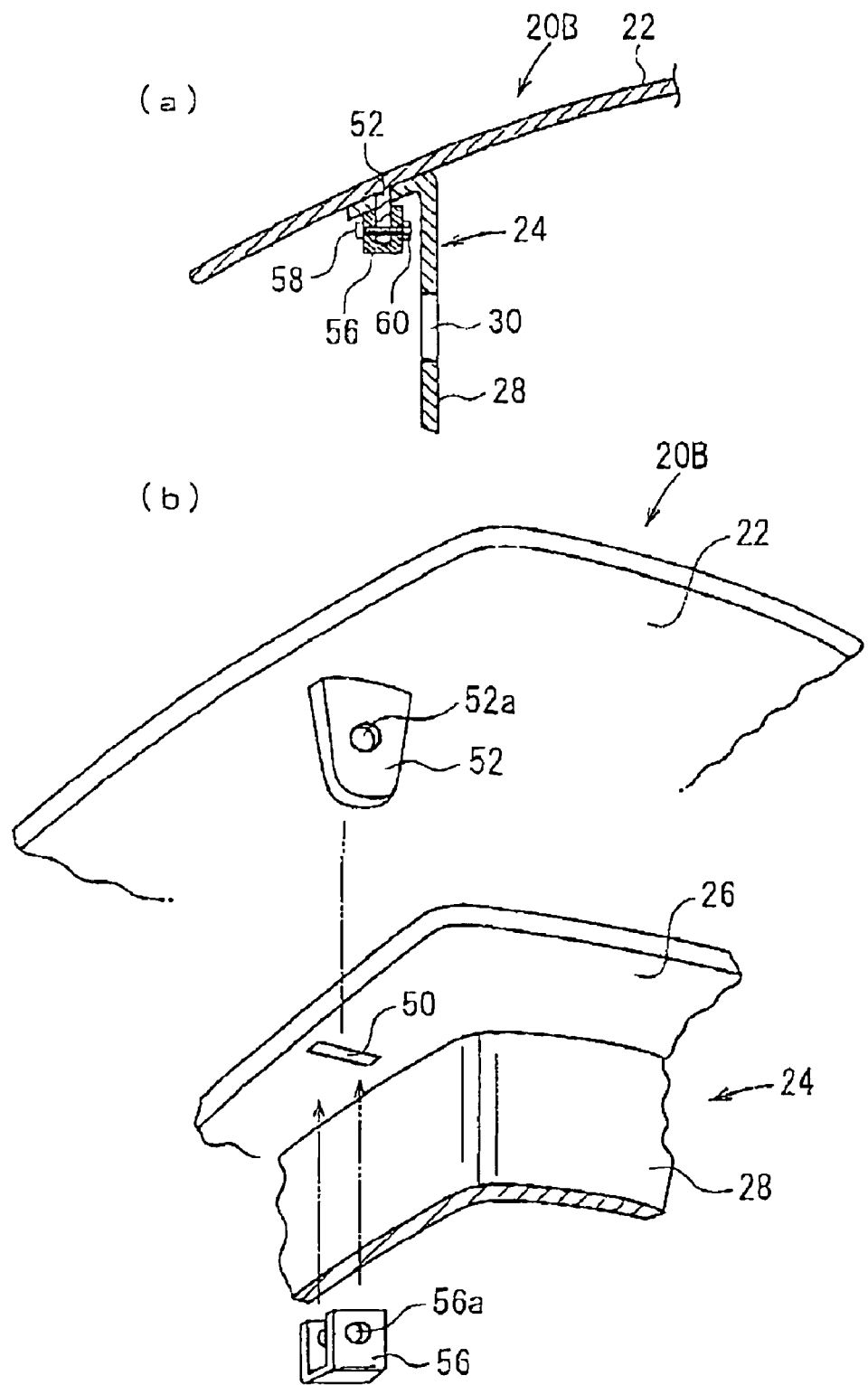
FIG. 5(*a*) is a cross sectional view of a module cover according to an embodiment of the present invention FIG. 5(*b*) is an exploded perspective view of the module cover shown in FIG. 5(*a*).

Other construction of the module covers 20A, 20B in FIGS. 4, 5 are the same as the module cover 20 described above.

The embodiment described above is illustrated as an example of the present invention, and modes other than described above may be employed. For example, arrangements of the tear line may be different from those shown in the drawings, and the leg strip member and the retainer may be fastened with other connecting means, such as rivets. The embodiments described above relate to an airbag apparatus for a front seat. However, the present invention may be applied to an airbag apparatus for a driver's seat or for rear seats.

As described above, according to the present invention, a module cover having no hangnail present on the top plate member, and being opened smoothly without increasing the power of the inflator, is proposed.

The priority document, Japanese Patent Application No. 2002-360852, filed Dec. 12, 2002, is hereby incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cover for an airbag module comprising:
a plate member having a top surface to be exposed to a vehicle cabin and a back surface, wherein the plate member is configured to be mated with an instrument panel; and
a frame member extending from and directly abutting the back surface of the plate member;
wherein the plate member and the frame member are configured to be formed separately and joined after formation;
wherein the frame member includes a first opening for the airbag such that the frame member does not deform when the airbag is being deployed, a second opening configured to be connected to a retainer for retaining the airbag, an extension member and a plurality of engaging holes disposed on the extension member for receiving connecting portions of the retainer;
wherein a portion of the plate member is completely over the first opening of the frame member such that the portion of the back surface over the first opening is completely exposed to the airbag, and the entire periphery of the first opening of the frame member directly abuts the back surface of the plate member; and
wherein the plate member is an elastomeric material.

2. A cover for an airbag module according to claim 1, wherein the elastomeric material is a thermoplastic elastomer.

3. A cover for an airbag module according to claim 1, wherein the frame member is formed of thermoplastic synthetic resin.

4. A cover for an airbag module according to claim 1, further comprising a bond between the plate member and the frame member.

5. A cover for an airbag module according to claim 4, wherein the bond comprises a vibration welded bond.

6. A cover for an airbag module according to claim 1, wherein the frame member includes a base portion.

7. A cover for an airbag module according to claim 6, wherein the base portion is joined with the back surface of the plate member.

8. A cover for an airbag module according to claim 6, further comprising a bond between the base portion and the plate member.

9. A cover for an airbag module according to claim 8, wherein the bond comprises a vibration welded bond.

10. A cover for an airbag module according to claim 6, wherein the extension member extends in a direction away from the back surface of the plate member.

11. A cover for an airbag module according to claim 10, wherein the base portion extends from the extension member in a direction away from a center portion of the plate member and in a direction toward an edge portion of the plate member.

12. A cover for an airbag module according to claim 6, wherein the plate member includes a projection formed on the back surface;
wherein the base portion includes an aperture; and
wherein the aperture is configured to accept the projection.

13. A cover for an airbag module according to claim 12, wherein the projection is received in the aperture.

14. A cover for an airbag module according to claim 13, wherein an engagement between the projection and the aperture is undetachable.

15. A cover for an airbag module according to claim 13, wherein an end of the projection includes a keeper member, and
wherein the keeper member is configured to enlarge an end of the projection so that the projection remains engaged with the aperture.

16. A cover for an airbag module according to claim 15, wherein the keeper member comprises caulking.

17. A cover for an airbag module according to claim 13, further comprising a retaining member, and
wherein the retaining member is attached to an end of the projection so that the projection remains engaged with the aperture.

18. A cover for an airbag module according to claim 17, wherein the retaining member comprises a clip.

19. A cover for an airbag module comprising:
a plate member configured to be mated with an instrument panel; and
a frame member extending from and directly abutting a back surface of the plate member;
wherein the plate member and the frame member are configured to be formed separately and joined after formation;
wherein the plate member is formed of thermoplastic elastomer;
wherein the frame member includes a first opening for the airbag such that the frame member does not deform when the airbag is being deployed, a second opening configured to be connected to a retainer for retaining the airbag, an extension member and a plurality of engaging holes disposed on the extension member for receiving connecting portions of the retainer; and
wherein a portion of the plate member is completely over the first opening of the frame member such that the portion of the back surface over the first opening is completely exposed to the airbag, and the entire periphery of the first opening of the frame member directly abuts the back surface of the plate member.

20. A cover for an airbag module for a vehicle comprising:
a plate member having a top surface to be exposed to a vehicle cabin and a back surface, wherein the plate member is configured to be mated with an instrument panel; and
a frame member directly connected to the back surface of the plate member;
wherein the frame member is not integral with the plate member and includes a first opening for the airbag so that, when deploying, the airbag does not deform the frame member, a second opening configured to be connected to a retainer for retaining the airbag, an extension member and a plurality of engaging holes disposed on the extension member for receiving connecting portions of the retainer;
wherein the plate member is an elastomeric material; and
wherein a portion of the plate member is completely over the first opening of the frame member such that the portion of the back surface over the first opening is completely exposed to the airbag, and the entire periphery of the first opening of the frame member directly abuts the back surface of the plate member.

21. An airbag module for protecting an occupant of a vehicle comprising:
an airbag; and
a cover having a plate member and a frame member;
wherein the plate member has a top surface to be exposed to a vehicle cabin and a back surface;

wherein the frame member extends from and directly abuts the back surface of the plate member;

wherein the plate member is configured to be mated with an instrument panel;

wherein the plate member and the frame member are configured to be formed separately and joined after formation;

wherein the frame member includes a first opening for the airbag such that the frame member does not deform when the airbag is being deployed, a second opening configured to be connected to a retainer for retaining the airbag, an extension member and a plurality of engaging holes disposed on the extension member for receiving connecting portions of the retainer;

wherein a portion of the plate member is completely over the first opening of the frame member such that the portion of the back surface over the first opening is completely exposed to the airbag, and the entire periphery of the first opening of the frame member directly abuts the back surface of the plate member; and wherein the plate member is an elastomeric material.

22. An airbag module according to claim 21, further comprising a retainer for retaining the airbag, wherein the retainer comprises connecting fixture with a plurality of hooks for insertion into the plurality of engaging holes of the frame member.

* * * * *